United States Patent [19]

Wu et al.

[11] Patent Number: 5,648,110
[45] Date of Patent: Jul. 15, 1997

[54] FRENCH FRY FORMULATIONS AND METHOD OF MAKING

[75] Inventors: Yangsheng Wu, Englewood; John Harold Woerman, Highlands Ranch, both of Colo.

[73] Assignee: Penwest Foods Co., Englewood, Colo.

[21] Appl. No.: 465,939

[22] Filed: Jun. 6, 1995

[51] Int. Cl.⁶ .................. A23B 7/16; A23L 1/216
[52] U.S. Cl. ........................... 426/102; 426/637
[58] Field of Search ......................... 426/102, 637

[56] References Cited

U.S. PATENT DOCUMENTS

| | | |
|---|---|---|
| 3,597,227 | 8/1971 | Murray et al. |
| 3,751,268 | 8/1973 | Van Patten et al. |
| 4,317,482 | 3/1982 | El-Hag et al. |
| 4,504,509 | 3/1985 | Bell et al. .................. 426/549 |
| 5,059,435 | 10/1991 | Sloan et al. ................ 426/637 |
| 5,141,759 | 8/1992 | Sloan et al. |

FOREIGN PATENT DOCUMENTS

WO85/01188  3/1985  WIPO .

*Primary Examiner*—Helen Pratt
*Attorney, Agent, or Firm*—Marshall, O'Toole, Gerstein, Murray & Borun

[57] ABSTRACT

The present invention provides improved compositions for coating of potato strip products having an as is solids content which comprises not less than about 50% by weight ungelatinized crosslinked potato starch having a viscosity of from 200 to 1100 BU when measured at 9% solids concentration for 15 minutes at 95°, and from 15 to 25% by weight rice flour.

3 Claims, No Drawings

FRENCH FRY FORMULATIONS AND METHOD OF MAKING

BACKGROUND OF THE INVENTION

The present invention relates generally to coated potato products and formulations for coating potato products such as frozen french fries.

Methods for preparing and applying coatings to the outer surfaces of frozen potato products are well known in the art. Murray et al. U.S. Pat. No. 3,597,227 disclose a process in which raw potato strips are coated in a hot aqueous solution of modified gelatinized amylose derived from corn or potato starch. The process is said to produce a finished product which has superior strength and rigidity. Van Patten et al., U.S. Pat. No. 3,751,268 disclose the coating of blanched potato pieces with an ungelatinized unmodified high amylose starch having an amylose content of at least 50 percent. The coated potato strips are deep fat fried during which the starch in the coating is gelatinized.

El-Hag et al. U.S. Pat. No. 4,317,842 discloses the process of dipping blanched potato strips in an aqueous ungelatinized starch slurry to coat the strips, which are next soaked in hot oil to gelatinize the starch in the coating. The strips are then parfried and frozen. The strips may be reheated for consumption by heating in an oven rather than by deep fat frying.

Lenchin et al., WO 85/01188 disclose batters comprising the flour of high amylose corn hybrids for producing microwaveable pre-fried foodstuffs. The use of flours of high amylose corn hybrids is said to provide pre-fried foodstuffs with improved crispness after microwave cooking which otherwise tends to make such products soggy.

Sloan et al., U.S. Pat. Nos. 5,059,435 and 5,141,759 disclose a process for preparing frozen coated potatoes wherein raw potatoes are washed, cut, blanched and partially dehydrated. The cut potatoes are then coated with an aqueous starch slurry comprising 15 to 35% by weight modified ungelatinized potato starch, 2 to 10% by weight modified ungelatinized corn starch, 2 to 10% by weight rice flour and other optional ingredients. The coated potato strips are parfried in oil and then frozen. The frozen strips are prepared for consumption by either finish frying in hot oil, or heating in an oven. The starch coating is said to enhance the holding quality of the ready to consume product and to improve the acceptability of the finished product by increasing the crispness of the outer surface, and helping to maintain the tenderness of the interior of the cut potato. In particular, the potato starch and corn starch are said to contribute crispness to the coating, and because they are not gelatinized prior to the parfrying step they decrease clumping of the strips during processing. The rice flour is said to provide a desirable tenderness in the finished product.

The Sloan patents teach the use of potato starches which have been modified through known chemical cross-linking processes in order to minimize sticking or clumping of the strips during processing, and coat the potato strips evenly. The Sloan patents disclose as preferred an ungelatinized chemically modified potato starch (K-1010, Penford Corporation, Richland, Wash.) which is crosslinked with phosphorus oxychloride ($POCl_3$) at an effective level of 980 ppm. (This starch is characterized by a Brabender Amylograph viscosity of 50–100 BU ("Brabender units") when measured at a 9% starch solids concentration for 15 minutes at 95° C.) A chemically modified ungelatinized cornstarch said to be preferred for use in conjunction with the above modified potato starch is said to be Flojel® 60 (National Starch and Chemical Corp., Bridgewater, N.J.) which is said to contribute crispness to the coating and to produce an optimal result when present in the coating slurry at a concentration of between two and ten percent by weight.

Despite the many advances in the french fry coating art there nevertheless remains a need for improved enrobing slurries characterized by improved crispness, holding and flavor properties.

SUMMARY OF THE INVENTION

The present invention provides improved aqueous starch enrobing slurries which provide improved flavor, crispness and other physical properties to coated potato products such as french fries. As one aspect of the present invention, starch enrobing slurries have been found that provide various improved properties to the resulting french fries which they are used to encoat. Specifically it has been found that unexpected crispness can be obtained in a french fry coating composition by utilizing a crosslinked potato starch characterized by a selected viscosity in combination with rice flour. It has further been found that such improved properties are provided in the absence of corn starch or in a composition substantially free of corn starch. By eliminating the need for corn starch, the off-flavors associated with its use may also be eliminated.

Specifically, the invention provides improved aqueous starch enrobing slurries for coating the outer surface of a potato product having an as is solids content comprising not less than about 50% by weight of an ungelatinized crosslinked potato starch characterized by a viscosity of from 200 to 1100 BU when measured at 9% solids concentration after 15 minutes at 95° C., and from about 10% to about 25% by weight rice flour. "As is solids content" refers to the amount of solids present in typical commercially available potato starch which is not bone dry but typically comprises 12% to 16% water by weight. For the purposes of this invention "as is solids content" refers to a solids content for a starch assuming a water concentration of 14% by weight.

The invention further provides frozen potato products with a film-like coating on the outer surface and processes for their preparation, which processes comprise the steps of: cutting the raw potatoes; blanching the potatoes; partially drying the potatoes; coating the potatoes with an aqueous starch slurry, the starch slurry having an as is solids content comprising not less than about 50% by weight of an ungelatinized crosslinked potato starch characterized by a viscosity of from 200 to 1100 BU when measured at 9% solids concentration after 15 minutes at 95° C., and from about 10 to about 25% by weight rice flour; parfrying the potatoes in hot oil; and freezing the potatoes.

The invention further provides a process for preparing an aqueous starch enrobing slurry for coating the outer surface of a potato product, which comprises forming an aqueous slurry having an as is solids content comprising not less than about 50% by weight of an ungelatinized crosslinked potato starch characterized by a viscosity of from 200 to 1100 BU when measured at 9% solids concentration after 15 minutes at 95° C. and from about 10 to about 25% by weight rice flour. All ingredients stated herein are based on dry ingredients as 100%, with 100% to 400%, preferably 120% to 300% water added based upon dry ingredients to make the batter slurry.

DETAILED DESCRIPTION

Processes for the production of frozen french fries are well known and include the basic steps of preparing raw potatoes by washing, peeling and cutting into appropriately shaped pieces. The resulting potato strips are then blanched according to conventional methods in order to inactivate enzymes in the potato and to leach sugars from the surface of the potato strip. According to one preferred method, the blanched potato strips are treated in a brine solution comprising components such as sodium chloride, dextrose and other ingredients known to the art. After these steps, the potato strips are then subjected to a drying step to reduce the moisture present in the strips.

The strips are then coated with the aqueous starch enrobing slurry of the invention having an as is solids content comprising not less than about 50% by weight of ungelatinized crosslinked potato starch characterized by a viscosity of from 200 to 1100 BU when measured at 9% solids concentration after 15 minutes at 95° C. and from 10 to 25% by weight rice flour. After blending of the solid ingredients with a desired amount of water to produce the french fry batter, the batter may be applied to coat the cut potato strips at a batter pickup of from about 8% to about 30% with a pickup of from 13% to about 18% being preferred and a coating pickup of about 15% being particularly preferred, (based on coated potato strips weight).

After coating with the coating composition, the potato strips are drained and parfried at a temperature of from about 360° F. to about 390° F. for a time period of from 40 seconds to about 90 seconds. Parfrying serves to gelatinize the starch of the potato strips and of the coating and removes moisture from the inside of the potato strip.

The potato strips are then frozen, packaged and preferably stored at a temperature below 0° F. until they are prepared for final consumption. In order to prepare the potato strips for consumption, they are cooked either by finish frying or by baking in an oven. After such preparation, potato strips prepared according to the invention are characterized by a crisp outer layer, a moist tender interior and improved flavor qualities compared to those prepared with coating compositions comprising corn starch components.

Potato starch is the major component of the coating batters of the invention because of its unique properties. Potato starch has bland flavor, excellent film-forming properties, good clarity after cooking, larger molecular weight of amylose and larger starch granule size than any other starches. These properties contribute to the formation of a crispy coating on french fries which they are used to coat.

Minor amounts of pregelled potato starches are preferably used in the compositions of the invention to provide viscosity control and suspension of the solids in the batter. Specifically, the aqueous slurry may have an as is solids content of up to about 5% by weight of an unmodified pregelled potato starch for viscosity control. One preferred unmodified pregelled potato starch for such use is available commercially as PenPlus® UM (Penwest Foods Co., Englewood, Colo.) which is preferably incorporated into the batter composition at a solids concentration of 2% to 5% by weight.

Nevertheless, the major solids component of the aqueous enrobing slurries of the invention is an ungelatinized crosslinked potato starch characterized by a viscosity of from 200 to 1100 BU when measured at a 9% solids concentration after 15 minutes at 95° C. Such potato starches typically have a crosslinking level of from 550 to 900 ppm using $POCl_3$. Unmodified starches are generally not suitable for use with the invention because they tend to gelatinize at lower temperatures than do the crosslinked starches and cause coated french fries to stick together during the early stage of frying. Modifying the starch by crosslinking solves this problem and helps control the viscosity of the starch. Nevertheless, it has been found that not all batters made from ungelatinized crosslinked potato starches produce satisfactory results. Specifically, it has been found that the viscosity of the crosslinked potato starch is critical to the overall qualities of the coated french fries and to the ability to eliminate corn starch from the enrobing slurry. Accordingly, ungelatinized crosslinked potato starches for use with the invention preferably are characterized by a viscosity of from 200 to 1100, and preferably 400 to 900, Brabender Amylograph units (BU) when measured at 9% solids concentration for 15 minutes at 95° C. according to the methodology set out below. It has been found that starches with low levels of crosslinking resulting in viscosities greater than about 1100 BU tend to produce french fries characterized as tough and chewy in the absence of a corn starch component. Moreover, the french fries tend to stick together during the early stages of frying and produce undesirable french fries. In addition, it has been found that in the absence of a corn starch component, highly crosslinked potato starches characterized by viscosities less than about 200 BU tend to produce french fries characterized as becoming less crispy faster than other coated fries. Such fries can be very crispy immediately after frying, but have short holding times.

While the viscosities of ungelatinized crosslinked potato starches are generally controlled by the degree to which the starch is crosslinked other factors, such as heat annealing which reduces viscosity and increases gelatinization temperature, can affect the actual viscosity when used according to the invention and measured according to procedure set out below. Nevertheless, it has been found that potato starches which have a crosslinking level of from 550 ppm to 900 ppm based upon the dry weight of starch of phosphorus oxychloride added during the crosslinking reaction result in starches having appropriate viscosities (ranging from about 200 to about 1100 BU according to the specified test method) for practice in the formulations of the invention. More preferably, the potato starches have a crosslinking level between 650 ppm and 800 ppm phosphorus oxychloride based upon the dry weight of starch tend to result in starches having preferred viscosities ranging from about 400 BU to about 900 BU.

The modified potato starches used in practice of the invention are crosslinked with any of a variety of agents according to methods well known to the art but are preferably crosslinked with phosphorus oxychloride under alkaline conditions. Sodium trimetaphosphate is useful for crosslinking but reacts more slowly than does phosphorus oxychloride and accordingly substantially more reagent is required to achieve the same level of crosslinking as would be achieved with phosphorus oxychloride. Adipic anhydride is also useful as a crosslinking agent but reacts even more slowly than does sodium trimetaphosphate. Less preferably, epichlorhydrin may also be used at equivalent levels of crosslinking. A particularly preferred starch for use with the invention is an ungelatinized potato starch crosslinked with phosphorus oxychloride at a concentration of 675 ppm ($POCl_3$) (XC190-01, Penwest Foods Co., Englewood Colo.).

Different potato starches having different levels of crosslinking, and thus exhibiting different viscosities, may be used together in practice of the invention. For example, one modified potato starch having a crosslinking level of 300 ppm and characterized by a relatively high viscosity may be used in conjunction with another modified potato starch having a crosslinking level of 1000 ppm and characterized by a relatively low viscosity to yield a blend of modified starches characterized by a crosslinking level and having a viscosity intermediate between those of the two components. It is noted that United States Food and Drug Administration regulations prohibit the use in food products of starches having greater than 1000 ppm $POCl_3$ crosslinking (based on dry weight of starch solids.) Thus, other potato starches which are crosslinked at a concentrations too high or too low and thus are characterized by viscosities inappropriate for use alone in practice of the invention can be used in conjunction with other potato starches provided that the overall potato starch component is characterized by a viscosity within the desired range. Nevertheless, it is generally preferred that the majority (i.e., greater than 50% by weight) of the potato starch component comprise a single unblended modified potato starch characterized by a viscosity of from about 200 to about 1100 BU according to the specified method being particularly preferred.

The method for determining the viscosity of ungelatinized crosslinked potato starches for use according to the invention utilizes a Brabender Amylograph viscometer according to conventional methods known to the art as set out below. Specifically, 45.0 grams of "dry basis" potato starch (to yield 9% solids) is placed in a beaker to which distilled water is added to make up 450 grams and is mixed thoroughly with a magnetic stirring bar. The pH of the mixture is adjusted to 7.0 with dilute (approx. 0.5%) NaOH or dilute (approx. 0.5%) HCl. The pH should be determined over a period of 5 to 10 minutes and should be measured both before and after the viscometer run. The starch slurry is then added to the viscometer bowl and the beaker rinsed with distilled water to give a total starch and water weight of 500 grams. The Brabender Amylograph is then run on program 2 comprising a starting temperature of 25° C., a heating rate of 1.5° C./minute to 95° C., running at 95° C. for 15 minutes wherein the measurement is taken at the conclusion of 15 minutes in Brabender units (BU), and cooling at 1.5° C./minute to 50° C.

The potato starches of the invention may also be further modified by acetylation or hydroxypropylation but such modification is not necessary for practice of the invention. If the potato starches are so modified, it is generally necessary to increase the level of crosslinking in order to obtain an equivalent level of viscosity.

The rice flour component of the starch enrobing slurry of the invention is preferably present at a solids concentration of from about 10% to about 25% by weight with concentrations of from about 15% to about 20% by weight (as is solids basis) being preferred. Greater concentrations of rice flour tend to make the final coated french fry products too tough while lower concentrations provide products with too little crispness. Rice flours suitable for use with the invention include long grain, medium grain or waxy rice with long grain rice flour being preferred. Long grain rice provides the best results for crispness, because of its higher amylose content in the starch. Use of medium grain rice flour tends to give a tough bite to the batter coating and waxy rice flour provides a hard crunch immediately after frying but the batter coating becomes soft and chewy within ten minutes after frying.

A variety of other flours and starches may optionally be used in producing the coating formulations of the invention including but not limited to potato flour, wheat flour, wheat starch, oat flour, oat starch, tapioca starch, corn flour and corn starch. Such starches may be crosslinked and/or substituted such as by acetylation or other means. Corn starch was found not to improve the crispness or texture of any of the batter coatings and moreover has been found to impart an objectionable cereal flavor to the french fries. Accordingly, the use of corn starch is not preferred.

Optional ingredients for use in providing the coating compositions of the invention include maltodextrins, dextrins, microcrystalline cellulose, hydroxypropyl methyl cellulose and gums which are used to provide improved structure and keeping qualities to the coated french fry products. Maltodextrins are preferably used at solids concentrations of up to 6%. Maltodextrins useful with the invention may be derived from any type of starch including potato and corn starch and include those characterized by having a DE in the range from 2 to 7 with maltodextrins having a DE of about 5 being preferred. Dextrins obtained from a variety of sources may also be used according to the invention.

Other suitable ingredients include gums such as guar and xanthan gums which are preferably added as components of blends with crosslinked potato starch products. Preferred gum blends comprise approximately 10% gum by weight and are preferably incorporated into the compositions of the invention at solids concentrations of less than 0.1% gum by weight.

Leavening agents in the form of baking powders may also be incorporated into the compositions of the invention in order to open up the structure of the coating batters upon cooking and release moisture from the french fry products without blowing off the coating layer. Suitable baking powders include sodium bicarbonate plus one or more leavening acids such as those in the group consisting of sodium aluminum phosphate (SALP), sodium aluminum sulfate (SAS), sodium acid pyrophosphate (SAPP), dicalcium phosphate (DCP), and anhydrous monocalcium phosphate (AMCP). The combination of sodium bicarbonate and SALP is preferred because of its bland flavor and slower action. SAPP and DCP give off-flavor in the coating and AMCP reacts too fast during mixing of the batter. Such leavening agents are preferably added at sodium bicarbonate concentrations of about 0.05 to 0.1%.

Additional ingredients include protein components such as sodium caseinate, nonfat dry milk, soy, whey, dried egg whims. Such proteins interact with the carbohydrates in the coating compositions to increase film strength, provide structure, improve crispness and prolong holding of crispness. Milk proteins perform better than egg whites or soy proteins in performing such functions. Other ingredients include carbohydrate components such as methyl cellulose, hydroxypropyl methyl cellulose, microcrystalline cellulose and the like. Still other optional ingredients may also be incorporated into the coating formulations of the invention including salt, flavorings, seasonings and coloring agents such as whey or dextrose. A particularly preferred dextrose product is available commercially as Cantab® (Penwest Foods Co., Englewood, Colo.).

Preferred starch enrobing slurries for use according the invention comprise on a dry solids weight basis from 55% to 70% of a modified ungelatinized potato starch having a viscosity of 400 to 900 BU according to the specified method and crosslinking level of from 650 to 750 ppm based on $POCl_3$; 0% to 15% modified potato starch having a crosslinking level of about 980 ppm based on $POCl_3$; 2.5% to 3% unmodified pregelled potato starch; 10% to 20% long grain rice flour; 0 to 0.2% of a xanthan gum blend comprising 5% xanthan gum and 95% modified potato starch; 0 to 0.2% of a guar gum blend comprising 8% guar gum and 90% modified potato starch; 0% to 1% of a baking powder blend comprising 10% SALP, 10% soda and 80% modified potato starch; 0% to 10% of maltodextrin characterized by a DE of from 2 to 7; 0% to 0.6% sodium caseinate; 0 to 2% nonfat dry milk; 0% to 4% sweet whey; 0% to 1% dextrose (Cantab®); and 0% to 10% salt to yield 100 parts solids. These solids are preferably blended with 150 to 200 parts of water to form the enrobing batter. The enrobing batter is then preferably applied to potato strips at a batter pickup of 13% to 18% by weight.

The french fry coating composition is prepared by dry blending of the various solid ingredients. The dry ingredients are then slowly added to an amount of water selected to provide an appropriate viscosity to the coating batter. It has been found that aqueous slurries containing from about 150 parts to about 300 parts by weight water to 100 parts by weight of the solid ingredients are characterized by a preferred viscosity for coating of the potato strips. The aqueous slurry is preferably maintained at a temperature of 70° F. or less during the mixing and coating processes in order to prevent gelatinization of the starch and spoilage of batter slurry. Because the starches remain ungelatinized during the coating process they do not substantially contribute to the viscosity of the solution.

The crispness of the batter coated french fries is determined by several factors including the cook-out of the starch, the moisture balance between the batter coating surface and inside of the fries, the thickness of the coating layer, and the interaction of ingredients in the coating formulation. The coating forms a dry, discontinuous film, which lets the moisture from the inside of the fries escape or vent out, but will not absorb the moisture into the coating layer. Controlling moisture migration is important to maintaining the crispness of the fries under a heat lamp. The coating should preferably be somewhat brittle, which gives a clean bite with minimum toughness. There is a fine balance between all the ingredients in the batter formula to achieve crispness and keeping quality with the method used to process the potato strips contributing to the crispness of the french fries.

Other aspects and advantages of the present invention will be understood upon consideration of the following illustrative and comparative examples.

EXAMPLE 1

According to this example, potato strips were prepared according to conventional methods and coated with various starch slurries comprising modified potato starches characterized by different levels of POCl₃ crosslinking and resulting viscosities were prepared using the ingredients listed in Table 1 below. The table presents the extent of crosslinking and the viscosity range for the resulting potato starch. For most potato starches the viscosity is presented as measured at a 9% solids concentration. For starches having lower levels of crosslinking and thus higher viscosities, it was necessary to measure the viscosity at a lower solids concentration, in this case 3.5% solids, and such starches are so indicated. The pregelled potato starches have significantly higher viscosities than do the ungelatinized potato starches.

Specifically, Russet-Burbank potatoes were peeled, cut into 9/32 inch strips and immersed and blanched in hot water for 4 to 8 minutes at 170°–180° F. After blanching, the potato strips were immersed for 30 seconds in an aqueous solution comprising 0.5% SAPP which was held at a temperature of 160°–170° F. After removal, the strips were drained and then dried in a conventional dryer at 190° F., for a sufficient length of time to effectuate a 12 to 20 percent water loss.

Starch slurries were then prepared comprising the ingredients listed in Table 1 including water at about 50° F. The water and dry ingredients were placed in a mixing bowl and mixed with a paddle for three minutes at low speed and one minute at medium speed with the batter temperature maintained at below 65° F. The potato strips were then dipped in the starch slurries and held at 65° F. The potato strips were then drained for 60 seconds to remove excess slurry and to achieve a slurry coating pickup of 15%. The strips were then parfried in soy oil for 50 seconds at 385° F. The potato strips were then frozen in a blast freezer for 30 minutes, transferred into plastic bags and kept in a regular freezer overnight at approximately 0° F. The frozen samples were reconstituted by frying at 360° F. for 2.5 minutes. The resulting french fries were then placed under heat lamps, and evaluated for color, bite, crispness, taste and holding time.

The resulting products were then tested to evaluate their properties including the degree of crispness (1 being the poorest and 5 being the best), and the time period for which they maintained their crispness with the results presented in Table 1. The results of evaluation of those batters show that the starch enrobing slurries produced from potato starches characterized by ungelatinized crosslinked potato starch viscosities of greater than about 1100 BU corresponding to levels of crosslinking of 500 ppm and below were characterized by poor crispness, short holding times, fries sticking together and other poor organoleptic properties. In contrast, those batters comprising potato starches having ungelatinized crosslinked potato starch viscosities less than about 1100 BU corresponding to crosslinking levels of about 550 ppm and higher provided improved crispness, longer heat lamp holding times of 15 or 20 minutes and superior organoleptic properties in the absence of corn starch. In particular, those batters comprising potato starches having ungelatinized crosslinked potato starch viscosities less than about 1100 BU corresponding to crosslinking levels of about 550 ppm and higher and further comprising rice flour at as is solids concentrations of 15% and higher provided significantly improved properties to the french fries to which they were applied compared with those coated with batters lacking rice flour or having lower crosslinking levels.

TABLE 1

| Ingredients (Crosslink/Visc.) | 1A | 1B | 1C | 1D | 1E | 1F | 1G | 1H |
|---|---|---|---|---|---|---|---|---|
| Modified Potato Starch (100 ppm/1700–1900 BU @ 3.5%) | 69.1 | 74.6 | 0 | 0 | 0 | 0 | 0 | 0 |
| Modified Potato Starch (213 ppm/500–600 BU @ 3.5%) | 0 | 0 | 69.1 | 74.6 | 0 | 0 | 0 | 0 |
| Modified Potato Starch (500 ppm/1200–1500 BU @ 9%) | 0 | 0 | 0 | 0 | 69.1 | 74.6 | 0 | 0 |

TABLE 1-continued

| Ingredients (Crosslink/Visc.) | | | | | | | | |
|---|---|---|---|---|---|---|---|---|
| Modified Potato Starch (550 ppm/1000–1100 BU @ 9%) | 0 | 0 | 0 | 0 | 0 | 0 | 61.4 | 0 |
| Modified Potato Starch (675 ppm/400–700 BU @ 9%) | 0 | 0 | 0 | 0 | 0 | 0 | 0 | 70 |
| Modified Potato Starch (880 ppm 100–200 BU @ 9%) | 0 | 0 | 0 | 0 | 0 | 0 | 0 | 15 |
| Unmodified Pregelled Potato Starch (PenPlus UM) | 3 | 2.5 | 3 | 2.5 | 3 | 2.5 | 3.0 | 2.9 |
| Rice Flour (Long Grain) | 18 | 18 | 18 | 18 | 18 | 18 | 20 | 0 |
| Guar Gum Blend (10%) | 0.2 | 0.2 | 0.2 | 0.2 | 0.2 | 0.2 | 0 | 0.2 |
| Xanthan Gum Blend (5% Keltrol F) | 0 | 0 | 0 | 0 | 0 | 0 | 0 | 0 |
| Baking Powder (10% SALP, 10% Soda) | 0.5 | 0.5 | 0.5 | 0.5 | 0.5 | 0.5 | 0.7[1] | 0.5 |
| Maltodextrin (DE 5) | 4 | 0 | 4 | 0 | 4 | 0 | 0 | 6 |
| Sodium Caseinate | 0.2 | 0.2 | 0.2 | 0.2 | 0.2 | 0.2 | 0 | 0.4 |
| Nonfat Dry Milk | 0 | 0 | 0 | 0 | 0 | 0 | 0 | 0 |
| Sweet Whey | 0 | 0 | 0 | 0 | 0 | 0 | 4 | 0 |
| Dextrose (Cantab ®) | 1 | 0 | 1 | 0 | 1 | 0 | 0 | 1 |
| Salt | 4 | 4 | 4 | 4 | 4 | 4 | 10 | 4 |
| Total | 100 | 100 | 100 | 100 | 100 | 100 | 100 | 100 |
| Water | 200 | 180 | 200 | 180 | 200 | 180 | 200 | 190 |
| Crispness, scale 1–5 | 2 | 3 | 3 | 3 | 4 | 4 | 4 | 4 |
| Comments, time crispy under heat lamp, minutes | chewy, tough, greasy 10 min. | tougher bite, sticking 10 min. | chewy, tough, greasy 10 min. | tough bite, sticking 15 min. | tough bite 15 min. | crispy 15 min. | 15 min. | softer bite 15 min. |

| Ingredients (Crosslink/Visc.) | 1I | 1J | 1K | 1L | 1M | 1N | 1O |
|---|---|---|---|---|---|---|---|
| Modified Potato Starch (100 ppm/1700–1900 BU @ 3.5%) | 0 | 0 | 0 | 0 | 0 | 0 | 0 |
| Modified Potato Starch (213 ppm/500–600 BU @ 3.5%) | 0 | 0 | 0 | 0 | 0 | 0 | 0 |
| Modified Potato Starch (500 ppm/1200–1500 BU @ 9%) | 0 | 0 | 0 | 0 | 0 | 0 | 0 |
| Modified Potato Starch (550 ppm/1000–1100 BU @ 9%) | 0 | 0 | 0 | 0 | 0 | 0 | 0 |
| Modified Potato Starch (675 ppm/400–700 BU @ 9%) | 60.9 | 49.6 | 63.9 | 56.8 | 70.9 | 57.1 | 57.9 |
| Modified Potato Starch (880 ppm 100–200 BU @ 9%) | 15 | 14 | 10 | 15 | 0 | 16 | 12 |
| Unmodified Pregelled Potato Starch (PenPlus UM) | 2.5 | 3 | 2.5 | 2.5 | 3 | 3 | 2.5 |
| Rice Flour (Long Grain) | 10 | 19 | 12 | 15 | 15 | 18 | 18 |
| Guar Gum Blend (10%) | 0.2 | 0 | 0 | 0.2 | 0.4 | 0.2 | 0 |
| Xanthan Gum Blend (5% Keltrol F) | 0 | 0 | 0.1 | 0 | 0 | 0 | 0.1 |
| Baking Powder (10% SALP, 10% Soda) | 0.5 | 0 | 0.5 | 0.5 | 0.5 | 0.5 | 0.5 |
| Maltodextrin (DE 5) | 6 | 3 | 5 | 4 | 0 | 0 | 4 |
| Sodium Caseinate | 0.4 | 0.4 | 0 | 0 | 0.2 | 0.2 | 0 |
| Nonfat Dry Milk | 0 | 0 | 1 | 1 | 0 | 0 | 1 |
| Sweet Whey | 0.5 | 0 | 0 | 0 | 0 | 0 | 0 |
| Dextrose (Cantab ®) | 0 | 1 | 0 | 0 | 0 | 1 | 0 |
| Salt | 4 | 10 | 5 | 5 | 10 | 4 | 4 |
| Total | 100 | 100 | 100 | 100 | 100 | 100 | 100 |
| Water | 180 | 200 | 180 | 180 | 200 | 200 | 180 |
| Crispness, scale 1–5 | 4 | 4 | 5 | 5 | 4 | 5 | 5 |
| Comments, time crispy under heat lamp, minutes | softer bite 15 min. | crispy 20 min. | crispy 20 min. | crispy 20 min. | crispy 15 min. | crispy 20 min. | crispy 20 min. |

[1] 0.7% sodium acid pyrophosphate and 0.9% baking soda

EXAMPLE 2

In this example, starch enrobing slurry compositions comprising modified potato starches having crosslinking levels greater than those of the invention were prepared and used to produce french fries according to the methods of Example 1. The results of testing those potato strips are presented in Table 2 below and show that the resulting french fry products are characterized by poor organoleptic properties and have a shorter holding time under a heat lamp during which they maintain their crispness. It was found that while products comprising potato starches with crosslinking levels greater than 900 ppm ($POCl_3$) did not perform as well as those of the invention, that such products lacking the presence of a corn starch component could approach having acceptable properties if the other components of the enrobing batter were precisely optimized. In such optimization, the concentration of rice flour and maltodextrin and the solids to water ratio of the batter have been found to be important.

TABLE 2

| Ingredients (Crosslink/Visc) | 2A | 2B | 2C | 2D | 2E |
|---|---|---|---|---|---|
| Modified Potato Starch (500 ppm/1200–1500 BU @ 9%) | 0 | 0 | 0 | 29 | 49 |
| Modified Potato Starch (880 ppm/100–200 BU @ 9%) | 0 | 0 | 67 | 40 | 20 |
| Modified Potato Starch (980 ppm/50–100 BU @ 9%) | 74.6 | 0 | 0 | 0 | 0 |
| Modified Potato Starch (990 ppm/30–50 BU @ 9%) | 0 | 68.6 | 0 | 0 | 0 |
| Unmodified Pregelled Potato Starch (PenPlus UM) | 2.5 | 2.5 | 3 | 3 | 3 |
| Rice Flour (Long Grain) | 18 | 18 | 20 | 18 | 18 |
| Guar Gum Blend (10% TIC 8/22) | 0.2 | 0.2 | 0.1 | 0.1 | 0.1 |
| Baking Powder (10% SALP, 10% Soda) | 0.5 | 0.5 | 0.5 | 0.5 | 0.5 |
| Maltodextrin (DE 5) | 0 | 0 | 4 | 4 | 4 |
| Sodium Caseinate | 0.2 | 0.2 | 0.4 | 0.4 | 0.4 |
| Nonfat Dry Milk | 0 | 0 | 0 | 0 | 0 |
| Sweet Whey | 0 | 0 | 0 | 0 | 0 |
| Dextrose (Cantab ®) | 0 | 0 | 0 | 0 | 0 |
| Salt | 4 | 10 | 5 | 5 | 5 |
| Total | 100 | 100 | 100 | 100 | 100 |
| Water | 180 | 180 | 200 | 200 | 200 |
| Crispness, scale 1–5 | 3 | 3 | 5 to 4 | 4 to 3 | 3 |
| Comments, time crispy under heat lamp, minutes | soft bite 10 min. | soft bite 10 min. | crispy 15 min. | softer bite 15 min. | tougher bite 15 min. |

EXAMPLE 3

In this example, further embodiments of the batter coating compositions of the invention were prepared and used to produce french fries according to the methods of Example 1. The results of testing those potato strips are presented in Table 3 below.

TABLE 3

| Ingredients (Crosslinking (POCl$_3$)/Visc.) | 3A | 3B | 3C | 3D | 3E |
|---|---|---|---|---|---|
| Modified Potato Starch (675 ppm 400–700 BU @ 9%)) | 60 | 62.8 | 59.5 | 59.7 | 62.5 |
| Modified Potato Starch (880 ppm/100–200 BU @ 9%)) | 10 | 10 | 0 | 10 | 0 |
| Unmodified Pregelled Potato Starch (PenPlus UM) | 2.5 | 2.5 | 2.5 | 3 | 3 |
| Rice Flour (Long Grain) | 18 | 18 | 20 | 18 | 20 |
| Guar Gum Blend (10% TIC 8/22) | 0.2 | 0.2 | 0 | 0.1 | 0 |
| Baking Powder (10% SALP, 10% Soda) | 0.5 | 0.5 | 0 | 0.5 | 0.5 |
| Maltodextrin (DE 5) | 4 | 0 | 4 | 4 | 0 |
| Sodium Caseinate | 0.3 | 0 | 0 | 0.2 | 0 |
| Nonfat Dry Milk | 0 | 1 | 0 | 0 | 0 |
| Sweet Whey | 0.5 | 0 | 4 | 0.5 | 4 |
| Dextrose (Cantab ®) | 0 | 0 | 0 | 0 | 0 |
| Salt | 4 | 5 | 10 | 4 | 10 |
| Methyl Cellulose Blend (12.5% A4M) | 0 | 0 | 0 | 0 | 0 |
| Dent Corn Flour | 0 | 0 | 0 | 0 | 0 |
| Microcrystalline Cellulose | 0 | 0 | 0 | 0 | 0 |
| Total | 100 | 100 | 100 | 100 | 100 |
| Water | 180 | 180 | 180 | 200 | 200 |
| Crispness, scale 1–5 | 5 | 5 | 5 | 5 | 4 |
| Comments, time crispy under heat lamp, minute | crispy 20 min. | crispy 20 min. | crispy 20 min. | crispy 20 min. | crispy 20 min. |

| Ingredients (Crosslilnking (POCl$_3$)/Visc.) | 3F | 3G | 3H | 3I | 3J | 3K |
|---|---|---|---|---|---|---|
| Modified Potato Starch (675 ppm/400–700 BU @ 9%) | 49.6 | 79 | 74 | 71.5 | 40 | 68.3 |
| Modified Potato Starch (880 ppm/100–200 BU @ 9%) | 14 | 0 | 8 | 0 | 0 | 0 |
| Unmodified Pregelled Potato Starch (PenPlus UM) | 3 | 6 | 5 | 4 | 3 | 2.5 |
| Rice Flour (Long Grain) | 19 | 0 | 0 | 10 | 25 | 18 |
| Guar Gum Blend (10% TIC 8/22) | 0 | 0 | 0 | 0.5 | 0 | 0.1 |
| Baking Powder (10% SALP, 10% Soda) | 0 | 0 | 2[1] | 2[2] | 0 | 0.5 |
| Maltodextrin (DE 5) | 3 | 0 | 0 | 0 | 0 | 2 |
| Sodium Caseinate | 0.4 | 0 | 0 | 0 | 0 | 0.2 |

TABLE 3-continued

| | | | | | | |
|---|---|---|---|---|---|---|
| Nonfat Dry Milk | 0 | 0 | 0 | 0 | 0 | 0 |
| Sweet Whey | 0 | 4 | 0 | 2 | 4 | 0.5 |
| Dextrose (Cantab ®) | 1 | 0 | 0 | 0 | 0 | 0 |
| Salt | 10 | 10 | 10 | 10 | 10 | 4 |
| Methyl Cellulose Blend (12.5% A4M) | 0 | 1 | 1 | 0 | 2 | 0 |
| Dent Corn Flour | 0 | 0 | 0 | 0 | 20 | 0 |
| Microcrystalline Cellulose | 0 | 0 | 0 | 0 | 0 | 4 |
| Total | 100 | 100 | 100 | 100 | 100 | 100 |
| Water | 200 | 248 | 240 | 220 | 200 | 200 |
| Crispness, scale 1–5 | 4 | 3 | 3 | 4 | 3 | 5 |
| Comments, time crispy under heat lamp, minutes | crispy 20 min. | tough bite 10 min. | off flavor 10 min. | after taste 10 min. | off flavor 10 min. | tough bite 15 min. |

[1](33.5% DCP, 10% Soda)
[2](15% SAPP, 10% Soda)

Numerous modifications and variations in the practice of the invention are expected to occur to those skilled in the art upon consideration of the presently preferred embodiments thereof. Consequently, the only limitations which should be placed upon the scope of the invention are those which appear in the appended claims.

What is claimed is:

1. An aqueous starch enrobing slurry for coating the outer surface of a potato product having an as is solids content comprising:

not less than about 50% by weight ungelatinized crosslinked potato starch characterized by a viscosity of from 200 to 1100 BU when measured at 9% solids concentration for 15 minutes at 95° C., and from 10 to 25% by weight rice flour and which is substantially free of corn starch.

2. A process for preparing a frozen potato product with a film-like coating on the outer surface, which comprises:

cutting the raw potatoes;

blanching the potatoes;

partially drying the potatoes;

coating the potatoes with an aqueous starch slurry, the starch slurry having an as is solids content comprising not less than about 50% by weight ungelatinized crosslinked potato starch characterized by a viscosity of from 200 to 1100 BU when measured at 9% solids concentration for 15 minutes at 95° C., and from 10 to 25% by weight rice flour and which is substantially free of corn starch;

parfrying the potatoes in hot oil; and freezing the potatoes.

3. A process for preparing an aqueous starch enrobing slurry for coating the outer surface of a potato product which comprises:

forming an aqueous slurry having an as is solids content comprising not less than about 50% by weight ungelatinized crosslinked potato starch characterized by a viscosity of from 200 to 1100 BU when measured at 9% solids concentration for 15 minutes at 95° C., and from 10 to 25% by weight rice flour and which is substantially free of corn starch.

* * * * *